(12) United States Patent
Cheng et al.

(10) Patent No.: US 8,569,992 B2
(45) Date of Patent: Oct. 29, 2013

(54) STEPPER MOTOR CONTROLLER AND METHOD FOR CONTROLLING SAME

(75) Inventors: Zhihong Cheng, Suzhou (CN); Zhijun Chen, Suzhou (CN); Shixiang Nie, Suzhou (CN)

(73) Assignee: Freescale Semiconductor, Inc., Austin, TX (US)

( * ) Notice: Subject to any disclaimer, the term of this patent is extended or adjusted under 35 U.S.C. 154(b) by 356 days.

(21) Appl. No.: 13/047,801

(22) Filed: Mar. 15, 2011

(65) Prior Publication Data

US 2011/0291604 A1     Dec. 1, 2011

(51) Int. Cl.
*H02P 8/00* (2006.01)
(52) U.S. Cl.
USPC ............................ 318/696; 318/685; 318/111
(58) Field of Classification Search
USPC .................... 318/696, 685, 111, 103, 801
See application file for complete search history.

(56) References Cited

U.S. PATENT DOCUMENTS

| | | | |
|---|---|---|---|
| 4,401,931 A | * | 8/1983 | Kulterman et al. ........... 318/696 |
| 5,216,347 A | | 6/1993 | Pace |
| 6,914,855 B2 | | 7/2005 | Stotz |

OTHER PUBLICATIONS

Microcomponents SA Data Sheet, "M-S Quad Driver X12.017", 2001.

* cited by examiner

*Primary Examiner* — Karen Masih
(74) *Attorney, Agent, or Firm* — Charles Bergere

(57) ABSTRACT

A stepper motor controller includes control circuitry with control outputs and individual driver pulse width modulation (PWM) circuitry with individual driver PWM outputs and modulation control inputs coupled to the control outputs. There is a group of individual drivers, each one having an input coupled to one of the PWM outputs, and an output coupled to an individual driver terminal of the controller. There is common driver PWM circuitry having a common driver PWM output. A common driver having a common driver input is coupled to the common driver PWM output and a common driver output is coupled to a common driver terminal of the controller. When a coil is connected between respective driver terminals and the common driver terminal, individual PWM driver currents are supplied to the coils from the individual driver terminals and a common PWM driver current is supplied to the coils from the common driver terminal.

20 Claims, 4 Drawing Sheets

STEPPER MOTOR CONTROLLER AND METHOD FOR CONTROLLING SAME

BACKGROUND OF THE INVENTION

The present invention relates to stepper motor controllers for controlling one or more stepper motors and a method for controlling a stepper motor with plurality of field coils. More specifically, the present invention relates to stepper motor controllers and methods that require a group of individual drivers and a common driver. Each of the field coils is connected between one of the individual drivers and the common driver.

Stepper motors have an armature that provides a rotor and one or more field coils that form a stator. Stepper motor controllers for such stepper motors supply driver currents to the stepper motor field coils in selected sequences to incrementally rotate the armature in steps. The driver current sequences can be selected to control a stepper motor to rotate the armature by full steps, partial steps, micro steps and by maintaining constant driver currents the armature can be maintained in a desired fixed angular position.

Stepper motor controllers have drivers for providing the driver currents. These drivers are typically two series connected complementary power transistors coupled between power supply nodes. When one driver is connected one end of a field coil and another driver is connected to the other end of the field coil a configuration known as an H-bridge is formed and therefore current can flow in either direction though the field coil.

Often stepper motor controllers are formed as a single semiconductor package or may be only part of the circuitry of a large multi-function semiconductor package. The trends and demands in the electronics industry require semiconductor packages to have relatively high functionalities condensed on small areas of silicon real estate. The overall size of the semiconductor package is also required to be as small as possible and therefore the number of external terminals (pins or pads or balls) is usually limited. It would therefore be desirable if the number of power transistors, and external terminals, associated with the stepper motor drivers were reduced without affecting the stepper motor controller's resolution requirements of incrementally rotating the armature in full step, partial step or in some circumstances even micro step increments.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
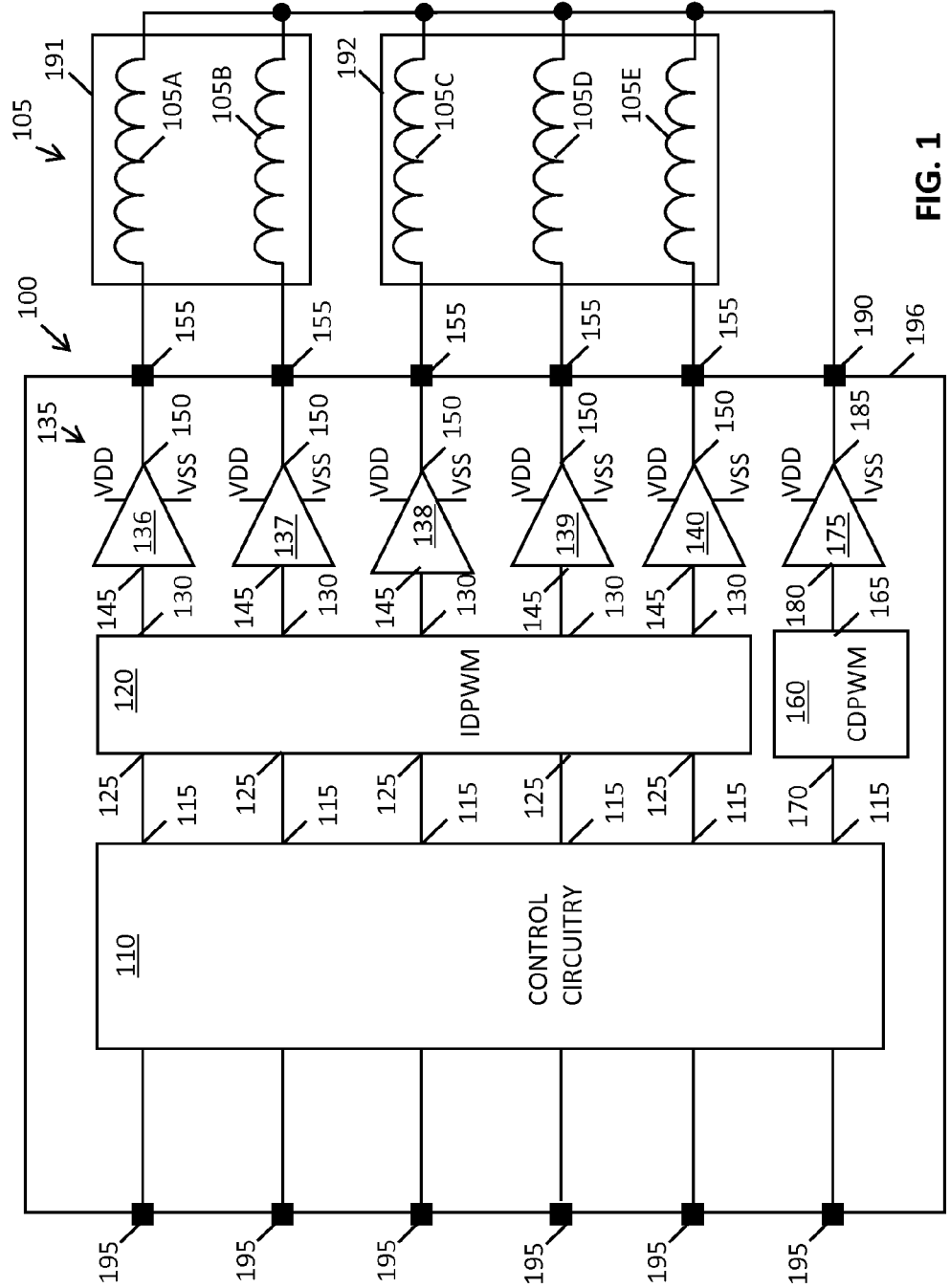
FIG. 1 is a schematic circuit diagram of a stepper motor controller when connected to stepper motor field coils in accordance with an embodiment of the present invention.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that circuit, device components and method steps that comprises a list of elements or steps does not include only those elements but may include other elements or steps not expressly listed or inherent to such circuit, device components or steps. An element or step proceeded by "comprises . . . a" does not, without more constraints, preclude the existence of additional identical elements or steps that comprises the element or step.

In one embodiment, the present invention provides a stepper motor controller for controlling one or more stepper motors. The stepper motor controller includes control circuitry with control outputs and there is individual driver pulse width modulation circuitry. The individual driver pulse width modulation circuitry has individual driver pulse width modulation outputs and modulation control inputs coupled to the respective control outputs. There is a group of individual drivers, each individual driver in the group has an individual driver input coupled to a respective one of the individual driver pulse width modulation outputs and an individual driver output coupled to an individual driver terminal of the controller. The stepper motor controller has common driver pulse width modulation circuitry having a common driver pulse width modulation output. There is also a common driver having a common driver input coupled to the common driver pulse width modulation output and a common driver output coupled to a common driver terminal of the controller. When there is one or more stepper motor field coils connected between respective driver terminals and the common driver terminal, individual pulse width modulated driver currents are supplied to the stepper motor field coils from the individual driver terminals and a common pulse width modulated driver current is supplied to the stepper motor field coils from the common driver terminal.

In another embodiment, the present invention provides for a method for controlling a stepper motor with a plurality of stepper motor field coils. The method is performed by a stepper motor controller with a group of individual drivers and a common driver. Each individual driver in the group has an individual driver output coupled to an individual driver terminal of the controller and the common driver has common driver output coupled to a common driver terminal of the controller. Also, each of the field coils is connected between respective individual driver terminals and the common driver terminal. The method includes selectively providing individual pulse width modulated driver currents provided by each individual driver at the respective individual driver terminals. Next, the method performs supplying a common pulse width modulated driver current provided by the common driver at the common driver terminal.

In a further embodiment, the present invention provides stepper motor controller for controlling one or more stepper motors. The controller has control circuitry with control outputs and there is a group of individual drivers. Each individual driver in the group includes an individual driver input coupled to a respective one of the control outputs and an individual driver output coupled to an individual driver terminal of the controller. There is common driver pulse width modulation circuitry with a common driver pulse width modulation output. There is also a common driver that has a common driver input coupled to the common driver pulse width modulation output and a common driver output that is coupled to a common driver terminal of the controller. When there is one or more stepper motor field coils connected between respective driver terminals and the common driver terminal, steady state digital logic values are supplied to the stepper motor field coils from the individual driver terminals. Also, a pulse width modulated driver current is supplied to the stepper motor field coils from the common driver terminal.

Referring to FIG. 1 there is illustrated a schematic circuit diagram of a stepper motor controller 100 for controlling one or more stepper motors when connected to stepper motor field coils 105 in accordance with an embodiment of the present invention. The stepper motor controller 100 includes control circuitry 110 that has control outputs 115 and there is individual driver pulse width modulation (IDPWM) circuitry 120 with modulation control inputs 125 coupled to respective individual outputs that are the control outputs 115. The individual driver pulse width modulation circuitry 120 also has individual driver pulse width modulation outputs 130 that provide pulse width modulation control signals. There are a group of individual drivers 135 and each individual driver 136,137,138,139,140 in the group of individual drivers 135 has an individual driver input 145 coupled to a respective one of the individual driver pulse width modulation outputs 130. Also, each individual driver 136,137,138,139,140 has an individual driver output 150 coupled to an individual driver terminal 155 of the controller 100.

The stepper motor controller 100 also includes common driver pulse width modulation (CDPWM) circuitry 160 with a common driver pulse width modulation output 165 and a modulation control input 170 coupled to one of the control outputs 115 of the control circuitry 110. There is also a common driver 175 that has a common driver input 180 coupled to the common driver pulse width modulation output and a common driver output 185 coupled to a common driver terminal 190 of the stepper motor controller 100. There are also other terminals 195 and the stepper motor controller 100 is enclosed in an enclosure 196 (a plastics molded housing or a ceramic housing) and stepper motor controller 100 is typically a semiconductor package with the terminals 155, 190 and 195 providing external electrical access. Furthermore, it will be apparent that other circuitry and terminals may be incorporated into the stepper motor controller 100 to facilitate power supply access and increased functionality. For instance, the stepper motor controller 100 may be one functional module in a much larger semiconductor package.

In use, and as illustrated, the one or more stepper motor field coils 105 are connected between respective individual driver terminals 155 and the common driver terminal 190. Each of the stepper motor field coils 105 may be the only field coil of a stepper motor or two or more stepper motor field coils 105 may form part of a stepper motor. For instance, in the illustration, stepper motor field coils 105A and 105B are the stator coils of a stepper motor 191 and stepper motor field coils 105C, 105D and 105E are the stator coils of a stepper motor 192. It should be noted that although only two stepper motors are illustrated, the number of individual drivers 135 can be varied as can the number of stepper motor field coils, per stepper motor, as well as the number of stepper motors. As such, the number of field coils 105 and stepper motors can be varied and the number of individual drivers 135 may be varied if desired.

As will be apparent to a person skilled in the field, in operation, individual pulse width modulated driver currents (IPWMDC) are supplied to the stepper motor field coils 105 from the individual driver terminals 155 and common pulse width modulated driver currents (CPWMDC) are supplied to the stepper motor field coils 105 from the common driver terminal 190. More specifically, the individual driver pulse width modulation outputs 130 provide pulse width modulation control signals to control the individual pulse width modulated driver currents (IPWMDC) supplied by the individual drivers 136,137,138,139,140. Also, the common driver pulse width modulation output 165 provides a pulse width modulation control signal to control the common pulse width modulated driver current (CPWMDC) supplied by the common driver 175.

In this embodiment, each of the individual drivers 136,137, 138,139,140 and the common driver 175 includes series connected complementary transistors coupled between power supply nodes VDD and VSS. Hence each of the individual drivers 136,137,138,139,140 and the common driver 175 form an H-bridge. For instance, individual driver 136, field coil 105A and the common driver form one H-bridge and individual driver 137, field coil 105B and the common driver form another H-bridge. Accordingly, individual pulse width modulated driver currents (IPWMDC) can flow from at least one of the individual driver outputs 150 and into the common driver output 185. Conversely, the common pulse width modulated driver current (CPWMDC) flows from the common driver output 185 and into at least one of the individual driver outputs 150. Since, the summation of all the modulated driver current flowing from the individual driver outputs 150 can flow into the common driver output 185 the common driver 175 has current rating greater than each individual driver 136,137,138,139,140.

In operation, in this embodiment the common pulse width modulated driver current (CPWMDC) has a duty cycle selectable, by the control circuitry, between 10% to 90%, or a narrower range of between 40% and 60% and typically the common pulse width modulated driver current (CPWMDC) has a duty cycle selected to be 50%. In contrast, each of the individual pulse width modulated driver currents (IPWMDC) have a duty cycle selectable between 0% to 100%.

Figure 2:
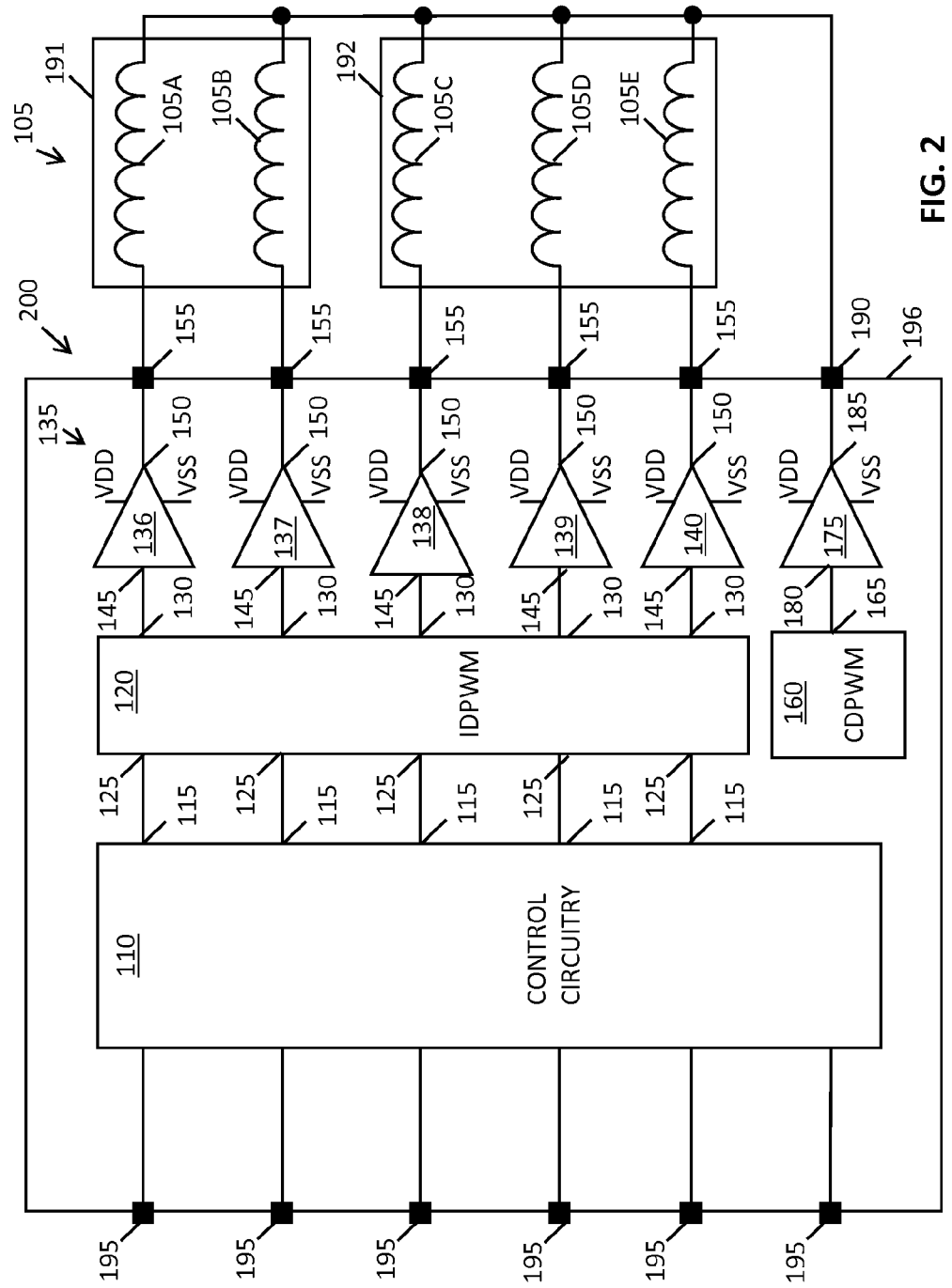
FIG. 2 is a schematic circuit diagram of a stepper motor controller when connected to stepper motor field coils in accordance with another embodiment of the present invention.

Referring to FIG. 2 there is illustrated a schematic circuit diagram of a stepper motor controller 200 for controlling one or more stepper motors when connected to stepper motor field coils 105 in accordance with another embodiment of the present invention. As most of the circuitry has been described above with reference to FIG. 1, a repetitive description of this circuitry is not required for one of skill in the art to understand the invention and only the differences will be described. As shown, there is no modulation control input 170 coupled to one of the control outputs 115, therefore the control circuitry 110 does not control the duty cycle of the common pulse width modulated driver current (CPWMDC). As a result, the common pulse width modulated driver current (CPWMDC) has a fixed duty cycle that is typically set at manufacture at 50% although other duty cycles are also possible.

Figure 3:
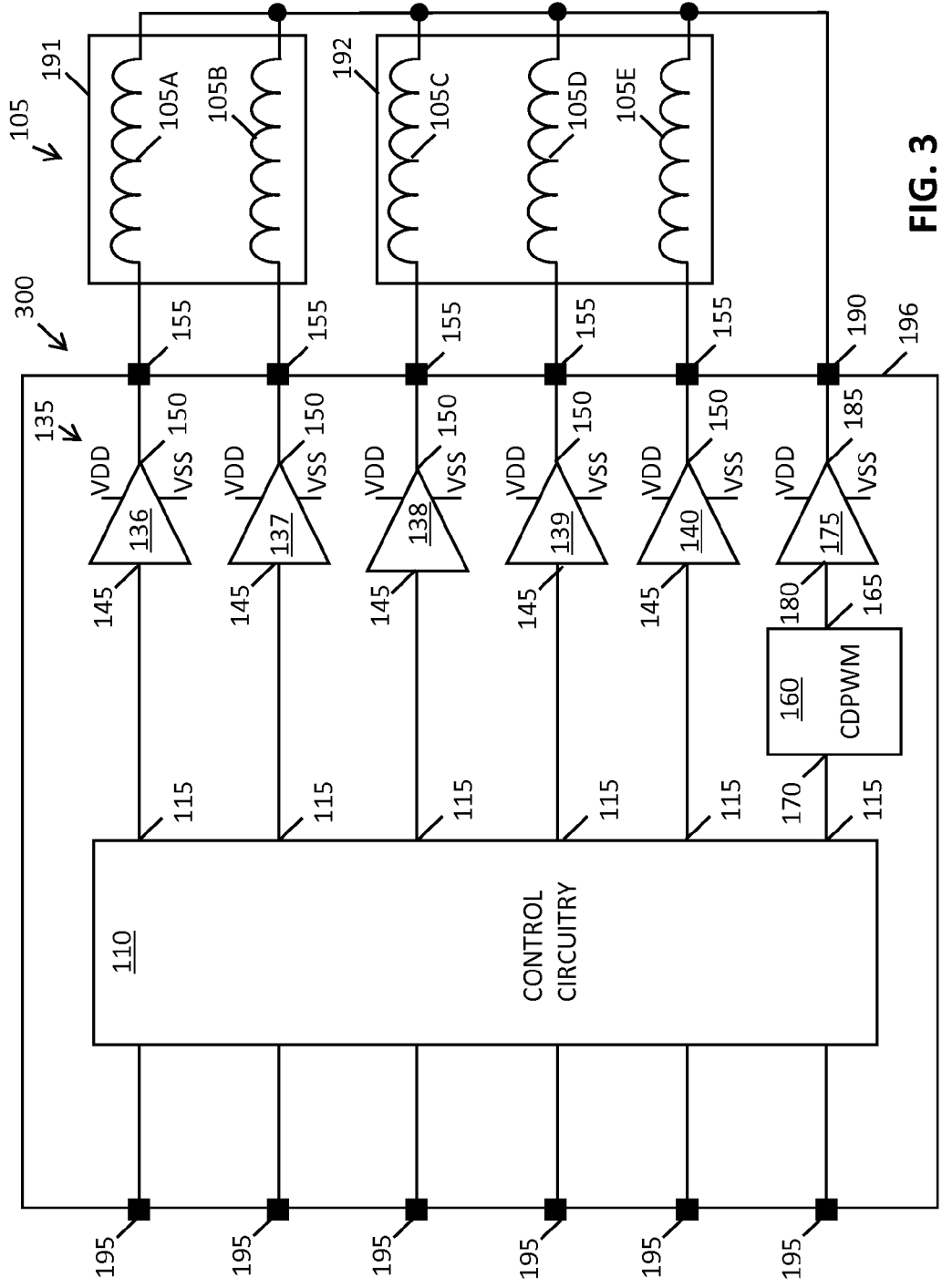
FIG. 3 is a schematic circuit diagram of a stepper motor controller when connected to stepper motor field coils in accordance with a further embodiment of the present invention.

Referring to FIG. 3 there is illustrated a schematic circuit diagram of a stepper motor controller 300 for controlling one or more stepper motors when connected to stepper motor field coils 105 in accordance with a further embodiment of the present invention. As most of the circuitry has been described above with reference to FIG. 1, a repetitive description of this circuitry is not required for one of skill in the art to understand the invention and only the differences will be described. As shown, there is no individual driver pulse width modulation (IDPWM) circuitry 120 and therefore all but one of the control outputs 115 are directly coupled to respective individual driver inputs 145. Consequently, there are no individual pulse width modulated driver currents (IPWMDC) instead there are steady state digital logic values (logic 1 or logic 0) supplied by the individual driver outputs 150 to their respective driver terminals 155.

Figure 4:
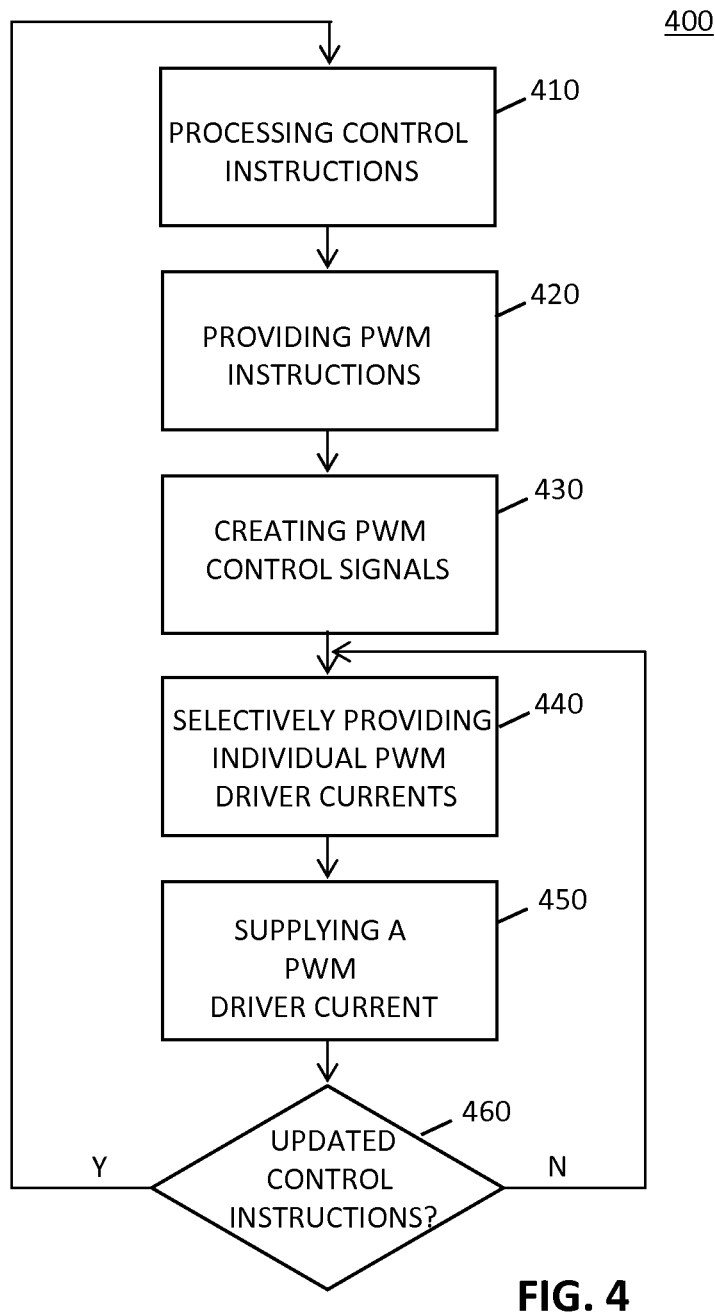
FIG. 4 is a flow chart of a method for controlling a stepper motor with a plurality of field coils in accordance with an embodiment of the present invention.

Referring to FIG. 4 there is illustrated a flow diagram of method 400 for controlling a stepper motor with a plurality of stepper motor field coils (for instance field coils 105) in accordance with an embodiment of the present invention. The method 400 can be performed by the stepper motor controller 100 or 200 with each of the stepper motor field coils 105A, 105B, 105C, 105D, 105E connected between respective individual driver terminals 155 and the common driver terminal 190. Initially the method 400 performs processing control instructions for selecting relevant pulse width modulation duty cycles and frequencies for each stepper motor at a block 410. The processing is performed by the control circuitry 110 and the control instructions are typically provided to control circuitry 110 via the terminals 195 of stepper motor controller 100 or 200. After the control circuitry 110 has processed the control instructions the method 400, at a block 420, performs providing pulse width modulation instructions at the control outputs 115 for each stepper motor that may be based on a start position of each stepper motor. The pulse width modulation instructions are received at the modulation control inputs 125 of the individual driver pulse width modulation (IDPWM) circuitry 120 and the modulation control input 170 of the common driver pulse width modulation (CDPWM) circuit 160.

At a block 440, the method 400 performs creating pulse width modulation control signals at both the individual driver pulse width modulation outputs 130 and the common driver pulse width modulation output 165. The pulse width modulation control signals are received and by the respective individual drivers 136, 137, 138, 139, 140 and the common driver 175. As a result, at a block 440, the method 400 performs selectively providing individual pulse width modulated driver currents provided by each individual driver 136, 137, 138, 139, 140 at the respective individual driver terminals 155. Furthermore, at a block 450 the method 400 performs supplying a common pulse width modulated driver current that is provided by the common driver 175 at the common driver terminal 190.

After block 440, a test block determines if there are any updated (new) control instructions (motor stepping commands), provided to control circuitry 110 via the terminals 195. If there are no updated (new) control instructions (motor stepping commands) then the method 400 returns to block 440. However, if there are updated (new) control instructions (motor stepping commands) then the method 400 returns to block 430 and the updated (new) control instructions (motor stepping commands) are processed by the control circuitry 110.

From the above, it will be understood that the method 400 can provide for controlling the stepper motors 191 and 192 by applying individual pulse width modulated driver currents of different duty cycles or identical duty cycles to their field coils 105. Also, the duty cycle of the common pulse width modulated driver current. For instance, the duty cycle of the individual pulse width modulated driver current supplied to the field coil 105A may be 60% and the duty cycle of the individual pulse width modulated driver current supplied to the field coil 105B may be 0%. Also, the duty cycle of the common pulse width modulated driver current may be set to 50% resulting in different current flow polarities in field coils 105A and 105B. As another example, the duty cycle of the individual pulse width modulated driver currents supplied to the field coils 105C, 105D, 105E can be set to a duty cycle of 20% and the duty cycle of the common pulse width modulated driver current may be set to 60%. Hence, a net current will flow from the common driver into the field coils 105C, 105D, 105E and into the individual drivers 138, 139, 140. However, if the modulated driver currents supplied to the field coils 105C, 105D, 105E are set to a duty cycle of 90% then a net current will flow from the individual drivers 138, 139, 140 into the field coils 105C, 105D, 105E and into the common driver 175.

From the above it will be apparent that the individual pulse width modulated driver currents can have different duty cycles. In one embodiment, each of the individual pulse width modulated driver currents have a duty cycle selectable between 0% to 100% and the common pulse width modulated driver current can have a fixed duty cycle of 50%. Alternatively, the common pulse width modulated driver current has a duty cycle selectable between 40% to 60%. However, it is envisaged that other common pulse width modulated driver current duty cycle ranges could be selectable, such ranges, for instance, can be between 20% to 80%, 10% to 90% or 0% to 100%. Hence, in operation, the present invention provides for allowing individual pulse width modulated driver currents to flow from at least one of the individual driver outputs 150 and into the common driver output 185. Also, the present invention allows for the common pulse width modulated driver current to flow from the common driver output 185 and into at least one of the individual driver outputs 150. The net current flow direction and magnitude in each of the stepper motor field coils 105A, 105B or each of the stepper motor field coils 105C, 105D determines the direction and speed (and possibly rotational position) of the stepper motors 191 and 192. Accordingly, the incremental steps of each of the stepper motors 191 and 192 can be controlled since the individual pulse width modulated driver currents can have different duty cycles.

Advantageously, the present invention can alleviate the problem associated with the number of power transistors and external terminals, associated with the stepper motor drivers. This is because the common driver 175 replaces numerous individual drivers and the common driver terminal 190 replaces numerous driver terminals. Furthermore, the selection of the pulse width modulation driver current duty cycles for the individual drivers allows the present invention to control one or more stepper motors without affecting a required stepper motor control resolution.

As will be apparent to one skilled in the art, the above embodiments may be implemented in any form of transistor technology such as Field Effect Transistors, bipolar transistors or otherwise and although power supply nodes VDD and VSS are mention in the specification this has no intention of limiting the invention to Field Effect Transistor implementations. Also, all the individual pulse width modulated driver currents and the common pulse width modulated driver current usually have the same frequency, however, it is envisaged that they could have different frequencies. Furthermore, it is acknowledge that there is no need for every one of the individual pulse width modulated driver currents to have the same frequency, however, normally all of individual pulse width modulated driver currents have the same frequency. The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A stepper motor controller for controlling one or more stepper motors, wherein the stepper motor controller has individual driver terminals and a common driver terminal, the stepper motor controller comprising:
   control circuitry having control outputs;
   individual driver pulse width modulation (PWM) circuitry having individual driver PWM outputs and modulation control inputs coupled to respective said control outputs;
   a group of individual drivers, each individual driver in the group having an individual driver input coupled to a respective one of the individual driver PWM outputs, and an individual driver output coupled to one of the individual driver terminals of the controller;

common driver PWM circuitry having a common driver PWM output; and a common driver having a common driver input coupled to the common driver PWM output, and a common driver output coupled to the common driver terminal of the controller, wherein when one or more stepper motor field coils are connected between respective individual driver terminals and the common driver terminal, individual PWM driver currents are supplied to the stepper motor field coils from the individual driver terminals, and a common PWM driver current is supplied to the stepper motor field coils from the common driver terminal.

2. The stepper motor controller of claim 1, wherein the individual driver PWM outputs include PWM control signals that control the individual PWM driver currents supplied by the individual drivers.

3. The stepper motor controller of claim 2, wherein the common driver PWM output includes a PWM control signal that controls the common PWM driver current supplied by the common driver.

4. The stepper motor controller of claim 3, wherein the individual PWM driver currents flow from at least one of the individual driver outputs and into the common driver output.

5. The stepper motor controller of claim 3, wherein, the common PWM driver current flows from the common driver output and into at least one of the individual driver outputs.

6. The stepper motor controller of claim 3, wherein each individual driver and the common driver includes series connected complementary transistors coupled between power supply nodes.

7. The stepper motor controller of claim 3, wherein the common driver PWM circuitry has a common control input coupled to one of the control outputs and wherein the common PWM driver current has a duty cycle selectable between 40% to 60%.

8. The stepper motor controller of claim 3, wherein the common driver PWM circuitry has a common control input coupled to one of the control outputs and wherein the common PWM driver current has a duty cycle selectable between 10% to 90%.

9. The stepper motor controller of claim 3, wherein the common PWM driver current has a fixed duty cycle.

10. The stepper motor controller of claim 3, wherein each of the individual PWM driver currents has a duty cycle selectable between 0% to 100%.

11. A method for controlling a stepper motor that has a plurality of stepper motor field coils, a plurality of individual driver terminals, and a common driver terminal, the method being performed by a stepper motor controller that has a group of individual drivers and a common driver, wherein each individual driver has an individual driver output coupled to one of the plurality of individual driver terminals, and the common driver has a common driver output coupled to the common driver terminal, and wherein each of the field coils is connected between respective individual driver terminals and the common driver terminal, the method comprising:

selectively providing individual pulse width modulated (PWM) driver currents provided by each individual driver at the respective individual driver terminals; and supplying a common PWM driver current provided by the common driver at the common driver terminal.

12. The method for controlling a stepper motor of claim 11, wherein the individual PWM driver currents flow from at least one of the individual driver outputs and into the common driver output.

13. The method for controlling a stepper motor of claim 12, wherein the common PWM driver current flows from the common driver output and into at least one of the individual driver outputs.

14. The method for controlling a stepper motor of claim 11, wherein at least two of the individual PWM driver currents have different duty cycles.

15. The method for controlling a stepper motor of claim 11, wherein each of the individual PWM driver currents has a duty cycle selectable between 0% to 100%.

16. The method for controlling a stepper motor of claim 11, wherein the common PWM driver current has a fixed duty cycle of 50%.

17. The method for controlling a stepper motor of claim 11, wherein the common PWM driver current has a duty cycle selectable between 10% to 90%.

18. The method for controlling a stepper motor of claim 11, wherein each individual driver and the common driver includes series connected complementary transistors coupled between power supply nodes.

19. A stepper motor controller for controlling one or more stepper motors, the controller comprising:

control circuitry having control outputs;

a group of individual drivers, each individual driver in the group having an individual driver input coupled to a respective one of the control outputs and an individual driver output coupled to an individual driver terminal of the controller;

common driver pulse width modulation (PWM) circuitry having a common driver PWM output; and a common driver having a common driver input coupled to the common driver PWM output and a common driver output coupled to a common driver terminal of the controller, wherein when one or more stepper motor field coils are connected between respective individual driver terminals and the common driver terminal, steady-state digital logic values are supplied to the stepper motor field coils from the individual driver terminals, and a PWM driver current is supplied to the stepper motor field coils from the common driver terminal.

20. The stepper motor controller of claim 19, wherein the common driver PWM circuitry has a common control input coupled to one of the control outputs, and wherein the common PWM driver current has a duty cycle selectable between 10% to 90%.

* * * * *